(12) United States Patent
Mendoza et al.

(10) Patent No.: US 12,546,791 B2
(45) Date of Patent: Feb. 10, 2026

(54) AUTOMATED RAPID ON-SITE EVALUATION MACHINE AND STAIN

(71) Applicant: The Regents of the University of California, Oakland, CA (US)

(72) Inventors: Alejandro S. Mendoza, Davis, CA (US); Alaa M. Afify, Davis, CA (US); Steven A. Lucero, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 858 days.

(21) Appl. No.: 17/597,498

(22) PCT Filed: Jul. 9, 2020

(86) PCT No.: PCT/US2020/041421
§ 371 (c)(1),
(2) Date: Jan. 7, 2022

(87) PCT Pub. No.: WO2021/007443
PCT Pub. Date: Jan. 14, 2021

(65) Prior Publication Data
US 2022/0276268 A1 Sep. 1, 2022

Related U.S. Application Data

(60) Provisional application No. 62/871,907, filed on Jul. 9, 2019.

(51) Int. Cl.
*G01N 35/00* (2006.01)
*B01L 3/00* (2006.01)
(Continued)

(52) U.S. Cl.
CPC .. *G01N 35/00029* (2013.01); *B01L 3/502715* (2013.01); *G01N 1/30* (2013.01);
(Continued)

(58) Field of Classification Search
CPC .... G01N 35/00029; G01N 1/30; G01N 1/312; G01N 35/1002; G01N 2001/302;
(Continued)

(56) References Cited

U.S. PATENT DOCUMENTS

| 4,741,898 A | 5/1988 | Mallik et al. |
| 7,790,107 B2 | 9/2010 | Nakaya |

(Continued)

FOREIGN PATENT DOCUMENTS

| JP | 2006047289 A | 2/2006 |
| WO | 2021007443 | 1/2021 |

OTHER PUBLICATIONS

International Search Report and Written Opinion dated Nov. 10, 2020 for international application PCT/US2020/041421.
(Continued)

*Primary Examiner* — Jill A Warden
*Assistant Examiner* — Alex Ramirez
(74) *Attorney, Agent, or Firm* — Stoel Rives LLP (57) ABSTRACT

An automated rapid on-site evaluation (ROSE) system for smearing, staining and capturing a digital image of a biological sample such as a fine needle aspiration (FNA) sample is presented. The system comprises a housing with a user interface monitor or screen, a smearing system, a staining system, and an image capture system. The housing can further include a receiver for a biological sample that can direct the sample to a sample slide. The smearing system is configured to smear the sample on the sample slide. The staining system is configured to stain the sample. The image capture system is configured to capture a magnified image of the sample and store the digital image in the housing or remotely. The digital images may be available immediately for local or off-site review. The wait time between staining the sample and image capture can be less than 60 seconds.

14 Claims, 6 Drawing Sheets

(51) Int. Cl.
*G01N 1/30* (2006.01)
*G01N 1/31* (2006.01)
*G01N 35/10* (2006.01)
*G02B 21/26* (2006.01)
*G02B 21/34* (2006.01)
*G02B 21/36* (2006.01)

(52) U.S. Cl.
CPC ......... *G01N 1/312* (2013.01); *G01N 35/1002* (2013.01); *G02B 21/26* (2013.01); *G02B 21/34* (2013.01); *G02B 21/362* (2013.01); *B01L 2200/16* (2013.01); *B01L 2300/0654* (2013.01); *G01N 2001/302* (2013.01); *G01N 2035/00138* (2013.01)

(58) Field of Classification Search
CPC ..... G01N 2035/00138; B01L 3/502715; B01L 2200/16; B01L 2300/0654; G02B 21/26; G02B 21/35; G02B 21/362
See application file for complete search history.

(56) References Cited

U.S. PATENT DOCUMENTS

| | | |
|---|---|---|
| 8,747,746 B2 | 6/2014 | Lefebvre |
| 2007/0077550 A1 | 4/2007 | Tohma et al. |
| 2007/0134651 A1 | 6/2007 | Oka et al. |
| 2007/0148046 A1* | 6/2007 | Nakaya .................... G01N 1/31 422/82.05 |
| 2010/0007727 A1 | 1/2010 | Torre-Bueno |
| 2011/0223632 A1* | 9/2011 | Yamada .................. G01N 1/312 435/40.51 |
| 2012/0002033 A1 | 1/2012 | Yamane et al. |
| 2014/0313313 A1 | 10/2014 | Soenksen |
| 2016/0041083 A1* | 2/2016 | Wanders ................ G01N 33/49 435/39 |
| 2016/0370264 A1* | 12/2016 | Campbell .............. G01N 1/312 |
| 2017/0115289 A1 | 4/2017 | Holmes et al. |
| 2017/0178361 A1 | 6/2017 | Berezhna et al. |
| 2017/0343454 A1 | 11/2017 | Nakanishi et al. |
| 2018/0156713 A1* | 6/2018 | Berezhna ............... G02B 7/365 |
| 2019/0137368 A1 | 5/2019 | Campbell |

OTHER PUBLICATIONS

1 Stain Technology, A Journal for Microtechnic and Histochemistry, 1967, vol. 42 (1), 7 pages.
Examination Report for EP Application 2083693.3 dated Dec. 17, 2024, pp. 1-9.
Extended European Search Report for EP Application 20836093.3 dated Jun. 23, 2023, pp. 1-11.

* cited by examiner

AUTOMATED RAPID ON-SITE EVALUATION MACHINE AND STAIN

RELATED APPLICATIONS

This application is the U.S. National Stage filing under 35 U.S.C. 371 of International Patent Application No. PCT/US2020/041421, filed on Jul. 9, 2020, and titled AUTOMATED RAPID ON-SITE EVALUATION MACHINE AND STAIN, which claims priority to U.S. Provisional Application No. 62/871,907, filed Jul. 9, 2019, and titled AUTOMATED RAPID ON-SITE EVALUATION MACHINE AND STAIN, each of which is incorporated herein by reference in its entirety.

TECHNICAL FIELD

The present disclosure relates generally to the field of rapid on-site evaluation (ROSE). More particularly, some embodiments relate to an automated ROSE machine for smearing, staining, and capturing images of biological samples (such as fine needle aspiration (FNA) samples) for evaluation.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Rapid on-site evaluation (ROSE) is a service that pathologists and cytotechnologists perform to check the cellular content and adequacy of biological samples such as fine needle aspiration (FNA) biopsy smears and biopsy touch prints. The samples may be obtained from numerous body sites, such as the lung, thyroid, pancreas, sentinel lymph nodes in breasts, skin, and the like. ROSE can inform an operator of sufficient cellular content of the sample and the adequacy of the sample smear and biopsy touch imprints. If sufficient cellular content is not obtained in the sample or the sample is uninformative, an additional sample may be obtained during the patient's appointment, avoiding the need for a follow-up appointment to obtain a new sample.

In some embodiments, ROSE allows for preliminary diagnosis so that additional sample can be requested for ancillary studies such as flow cytometry, microbiology cultures, or molecular studies. While the demand for ROSE is high, this service may not be readily available due to various issues, such as staffing and resources. ROSE-related services provided by a cytotechnologist, resident, or fellow may also not be reimbursable. Thus, time taken up by ROSE can be a revenue loss.

The present disclosure is directed to an automated ROSE machine for on-site evaluation of biological samples such as FNA samples. However, the automated ROSE machine may also be used to analyze other bodily fluids, frozen sections, and the like. The automated ROSE machine can be used without the services of a cytology professional, thus enabling hospitals to meet the demand for ROSE evaluations. Smearing and staining can be performed automatically in the automated ROSE machine. Use of the automated ROSE machine can lead to significant savings as manual microscopy is not required and digital images of the sample smear are captured, can be stored temporarily or permanently, and can be immediately available for local or off-site review. In further embodiments, the present disclosure is also directed towards stains that can be used with the automated ROSE machine, or with another evaluation machine.

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrase "coupled to" is broad enough to refer to any suitable coupling or other form of interaction between two or more entities, including mechanical and fluidic. Thus, two components may be coupled to each other even though they are not in direct contact with each other. The phrase "fluid communication" is used in its ordinary sense, and is broad enough to refer to arrangements in which a fluid (e.g., a gas or a liquid) can flow from one element to another element when the elements are in fluid communication with each other.

Figure 1:
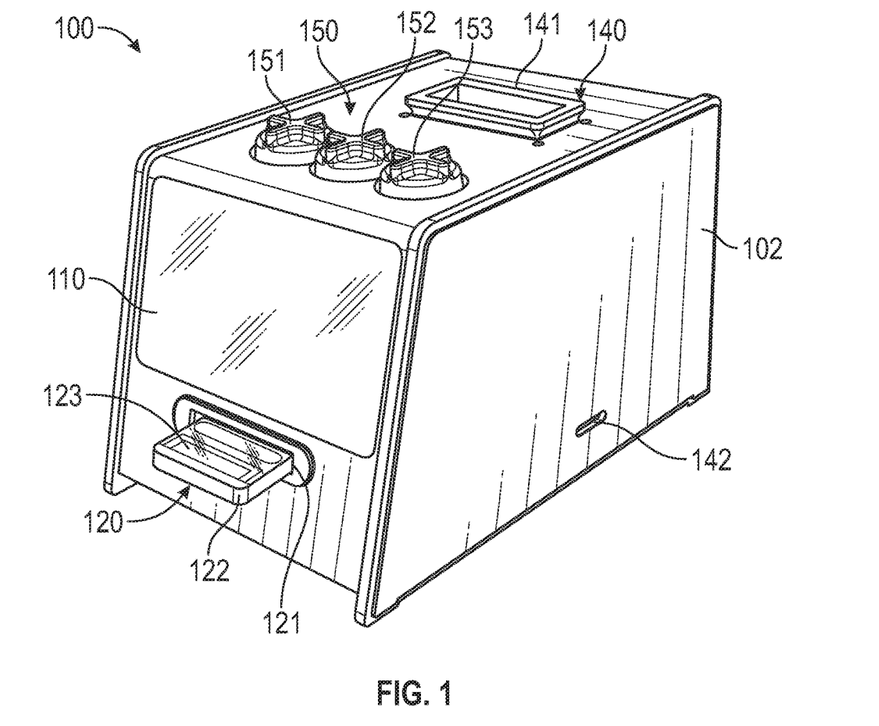
FIG. 1 is an isometric view of an automated rapid on-site evaluation (ROSE) machine for smearing, staining, and capturing images of biological samples, according to one embodiment of the present disclosure.
Figure 2:
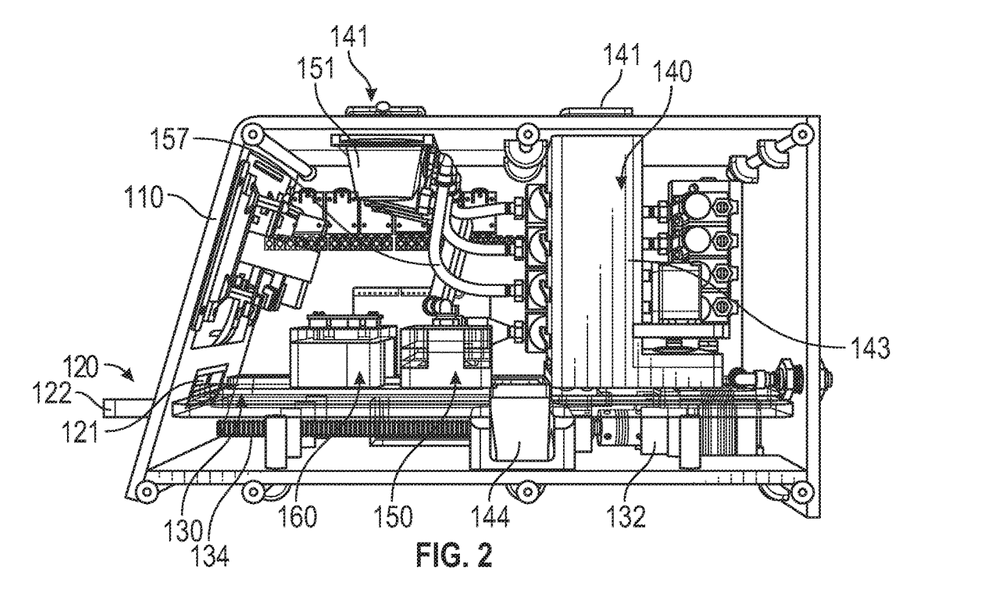
FIG. 2 is an inner view of the automated ROSE machine of FIG. 1.

FIG. 1 provides an isometric view of an automated ROSE machine 100. FIG. 2 illustrates an internal view of the automated ROSE machine 100. The automated ROSE machine 100 may comprise a housing 102, which can house the various components of the automated ROSE machine 100. In some embodiments, the ROSE machine 100 may include a user interface screen or monitor 110, a slide and/or sample receiver 120 for receiving a biological sample, a primary motor system or track system 130 for transporting or moving the sample into the automated ROSE machine 100 and to the different systems of the automated ROSE machine 100, a slide-smearer system 140 for smearing the sample, a staining system 150 for staining the sample, and an imaging system 160 for imaging the stained sample.

Figure 3:
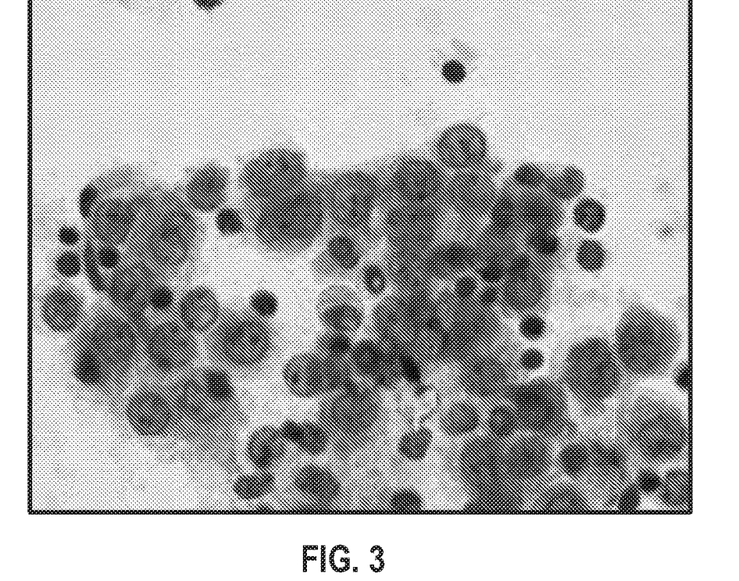
FIG. 3 shows a fine needle aspiration (FNA) sample stained with a toluidine, eosin, and alcohol (TEA) stain.

The automated ROSE machine 100 is able to process a biological sample obtained by an operator, smear the sample, stain the sample, and capture a magnified image of the stained sample. FIG. 3 illustrates an exemplary image of a stained FNA sample obtained by the automated ROSE machine 100.

The user interface screen 110 may enable an operator to input patient information, start the smearing, staining, and/or imaging process, change one or more parameters of the ROSE machine 100, and the like. For example, the user may control how much stain is used, the magnification of the image capture, whether to skip a specific step of the process, etc.

The user interface screen 110 may be an interactive touch-screen that may enable the operator to control the automated ROSE machine 100. The user interface screen 110 may also display a live image of the stained sample currently in the automated ROSE machine 100. The user interface screen 110 may also display previous images captured by the automated ROSE machine 100 that are stored in the memory of the ROSE machine 100.

The slide and/or sample receiver 120 may be configured to receive a sample such as an FNA sample from an operator. However, the present disclosure is not so limited, and the slide and/or sample receiver 120 may be configured to receive a variety of different samples, such as bodily fluids, frozen sections, and the like. The slide and/or sample receiver 120 may comprise a specimen entry port 121 for submitting the sample. In other words, the specimen entry port 121 is simply an opening in the housing 102 of the automated ROSE machine 100 to insert the sample into the automated ROSE machine 100. In some embodiments, the slide and/or sample receiver 120 may comprise a shelf 122 that extends out of the entry port 121. The shelf 122 may be configured to hold a sample slide 123. It will be appreciated that various types of slides can be used in accordance with the disclosure, including, but not limited to, glass slides, polymeric slides, and plastic slides. The sample may be deposited by the operator on the sample slide 123. The operator may deposit the sample in various locations on the sample slide 123. For example, the operator may deposit the sample in the center of the sample slide 123, or closer to a lateral edge of the sample slide 123. The automated ROSE machine 100 is configured to pull the sample within the automated ROSE machine 100 for smearing, staining, and imaging the sample after the operator deposits the sample and starts the automated ROSE machine.

In some embodiments, the automated ROSE machine 100 may house a plurality of slides 123 within the automated ROSE machine 100 which can be transported to the shelf 122. The sample is first obtained from a patient, after which the operator can deposit a predetermined amount of sample directly into the sample slide 123 on the shelf 122 (which can house or receive a slide). The shelf 122 may be flat so that when the sample is deposited on the sample slide 123, the sample does not run off of the sample slide 123 due to gravity. In some embodiments, the slide and/or sample receiver 120 does not comprise the shelf 122 and the sample slide 123 with the sample is simply inserted into the entry port 121 of the slide and/or sample receiver 120.

The track system 130 of the automated ROSE machine 100 is configured to transport the sample slide 123 with the sample to various locations within the automated ROSE machine 100. For example, the track system 130 is configured to transport the sample slide 123 to the smearing system 140, the staining system 150, and the imaging system 160. Other types of transport systems can also be used in addition to or in place of the track system 130.

In some embodiments, the port 121 of the slide and/or sample receiver 120 may be a receptacle to receive a sample. For example, the port 121 of the slide and/or sample receiver 120 may simply be an aperture through which the operator may insert the sample. After the sample is inserted into the port 121, the automated ROSE machine 100 may direct the sample to a specific location to prepare the sample for smearing, staining, and image capture.

The track system 130 may comprise a drive motor 132 that is configured to transport the sample slide 123 to the various locations within the automated ROSE machine 100. In some embodiments, the track system 130 transports the shelf 122 itself within the automated ROSE machine 100 to the various locations through the automated ROSE machine 100. In some embodiments, the track system 130 transports the sample slide 123 within the automated ROSE machine 100 to the various locations through the automated ROSE machine 100. In other embodiments, the shelf 122 comprises a stage that holds the sample slide 123 and the stage and the sample slide 123 are transported together within the automated ROSE machine 100 to the various locations through the automated ROSE machine 100.

In some embodiments, the track system 130 further comprises a worm gear 134. The drive motor 132 is configured to rotate the worm gear 134 and transport the sample slide 123 in a longitudinal direction of the automated ROSE machine 100. Other mechanical instruments can also be used in addition to or in place of the worm gear 134.

The smearing system 140 may be configured to automatically smear the sample on the sample slide 123, which can be done in a number of different ways. Smearing is the process of spreading the sample uniformly on the sample slide 123. The smearing system 140 may smear the sample with a smearing mechanism. The smearing mechanism of the automated ROSE machine 100 may smear the sample with another slide (e.g., a smearing slide), which can create two slide smears if desired (one on each slide—the sample slide and the smearing slide).

In the illustrated embodiment, the smearing system 140 comprises the slide-smearer entry port 141, a slide-smearer ejection port 142, and a slide storage chamber 143. Slides (not illustrated) may be inserted into the slide-smearer entry port 141 and then stored within the slide storage chamber 143. The slide storage chamber 143 may be configured to house a plurality of slides (e.g., glass, polymeric, or plastic slides).

In one embodiment, the sample may be smeared on the sample slide 123 by ejecting or pushing out a smearing slide out of the slide storage chamber 143 near the bottom of the slide storage chamber 143 chamber and onto the sample slide 123 with the sample. The smearing slide may be ejected out of the slide storage chamber 143 via a servo motor or other mechanical instrument. Once the smearing slide is on top of the sample slide 123 with the sample, the drive motor 132 may move the sample slide 123 and separate the smearing slide used for smearing, and the smearing slide may move down a ramp 144 to the slide-smearer ejection port 142. The smearing slide may have enough sample on it to perform staining separately.

The above example is only one way the sample may be stained. The sample may be stained in a plurality of other ways. For example, in one embodiment, the sample may be deposited on the sample slide 123 on a location near a first edge of a sample slide 123. After the sample is deposited on the sample slide, a smearing slide can be placed on top of the sample slide 123. The smearing slide may be released/dropped from the slide storage chamber 143. The automated ROSE machine 100 can then pull the smearing slide, optionally at an angle relative to the sample slide, in a direction towards a second lateral edge (which is opposite the first lateral edge) thereby smearing the sample. If desired, this method can be used to create two slides (the sample and smearing slides), each having a sample smear. The smearing slide may be ejected via the slide-smear ejection port 142 to be submitted later on to the lab for permanent staining.

In another embodiment, a sample can be deposited near a center of the sample slide 123. After the sample is deposited on the sample slide 123, a smearing slide can be placed on top of the sample slide 123 at an angle relative to the sample slide 123. The smearing slide may be released/dropped out of the slide storage chamber 143. The smearing slide may be rotated relative to the sample slide 123 in either a clockwise or counterclockwise direction. The rotation may be between 15 and 175 degrees. The rotation of the slides relative to each other can smear the sample on the sample slide 123. In some embodiments, the sample slide 123 and the smearing slide may rotate simultaneously relative to each other. For example, the sample slide 123 may rotate clockwise and the smearing slide may rotate counterclockwise, or vice versa. Once the slides are rotated relative to each other, the smearing slide is removed from the sample slide 123 and ejected via the sample-smearer ejection port 142. After the smearing glass slide is removed from the sample slide 123, the sample is smeared and ready for staining.

In another embodiment, the sample can be deposited near a lateral edge of the sample slide 123. After the sample is deposited on the sample slide 123, an edge of a smearing slide can be placed at an angle relative to the sample slide 123 against the sample. A constant force can then be applied to the sample by the edge of the smearing slide to smear the sample across the sample slide 123. The force applied to the sample can create a substantially constant smear across the sample slide 123. After the sample is smeared, the smearing slide is removed from the sample slide 123 and the sample is ready for staining.

In some embodiments, the smearing system 140 may comprise a spreader mechanism (not shown). The spreader is configured to smear the sample on the sample slide 123. The spreader may extend a height of the sample slide 123 and the spreader may move laterally relative to the sample slide 123. Accordingly, when the track system 130 transports the sample slide 123 to the smearing system 140, the spreader engages with a top surface of the sample slide 123 and moves laterally to smear the sample disposed on the sample slide 123. The spreader may also be similar to the spreader on the glass slide adaptor of U.S. Provisional Application No. 62/871,907, filed Jul. 9, 2019, and titled AUTOMATED RAPID ON-SITE EVALUATION MACHINE AND STAIN.

The staining system 150 may be configured to automatically stain the sample on the sample slide 123. Staining is the process of applying stains to the on the sample slide 123 to help visualize cell morphology and structure under a microscope. The automated ROSE machine 100 may stain the sample with one or more histological stains to help in the diagnosis process. Potential stains include the TEA stain (discussed below), methyl green, methylene blue, pyronin G, toluidine blue, acid fuschin, aniline blue, eosin, orange g, and the like.

The sample may be stained in a number of different ways. In some embodiments, the staining system 150 includes a programmable fluid dispensing system. The programmable fluid dispensing system may be pneumatic or non-pneumatic. The fluid dispensing system can be configured to dispense a stain on the sample smear. The staining solutions may comprise a single stain or may comprise a plurality of stains. Each stain can be dispensed one at a time on the sample smear and the stain can be configured to diffuse across the sample smear. After a first stain is dispensed on the sample smear, a second stain may optionally be dispensed on the sample smear if desired.

The staining system 150 comprises the plurality of stain reservoirs 151, 152, 153, stain dispensers 154, 155, 156, and tubing 157 that couples the stain reservoirs 151, 152, 153 to the dispensers 154, 155, 156. The stain reservoirs 151, 152, 153 may each house different stains, or they may hold the same stain. In some embodiments, one of the stain reservoirs 151, 152, 153 holds water or a cleanser for cleaning excess stain.

The stain dispensers 154, 155, 156 deliver an accurate volume of stain on top of the sample on the sample slide 123. If multiple stains are used, the stains may be applied in sequence. In some embodiments, the stains may be applied simultaneously.

Various types of stains can also be employed by the automated ROSE machine 100 disclosed herein. For instance, in certain embodiments, commercially available stains can be used, such as Diff-Quik stains. Additional stains disclosed herein can also be used. The ROSE machine 100 may be adapted to other stains and staining protocols.

In one embodiment, the present disclosure relates to stains that comprise toluidine and/or eosin. For instance, the automated ROSE machine 100 can employ a stain comprising toluidine, eosin, and alcohol (TEA). The image in FIG. 3 illustrates an FNA sample stained with the TEA stain. The TEA stain can be cost-effective and rapidly applied, making it suitable for automated ROSE evaluations. The TEA formulation disclosed herein can include, or otherwise be formulated from, various components or ingredients, each of which can impart one or more properties and/or characteristics to the stain formulation. In some embodiments, for example, the formulation of the TEA stain includes one or more fixative reagents, an eosinophilic solution, and a basophilic solution. Additional components (e.g., de-ionized water, additives, etc.) can also be included in the formulation as desired. The TEA stain may produce excellent image quality stains within 6 to 10 seconds without the need for air-drying.

In some embodiments, toluidine and eosin can be combined and applied as a single stain. In other embodiments, individual toluidine and eosin stains can be applied in succession (e.g., a toluidine stain followed by an eosin stain, or an eosin stain followed by a toluidine stain).

In embodiments employing two separate stains (e.g., a toluidine stain and an eosin stain), a first stain stored in a first stain reservoir can comprise a basophilic solution (e.g., thiazide dye) and a fixative reagent. For example, in some embodiments, the basophilic solution is toluidine blue and the fixative reagent is an alcohol, such as ethanol. Toluidine blue is a basic thiazine metachromatic dye with high affinity for acidic tissue components. Toluidine blue stains nucleic acids blue and polysaccharides purple. Toluidine blue powder may be mixed with ethanol (e.g., 95% ethanol) and water to form the stain. In some embodiments, the amount of toluidine blue ranges from 0.1% to 5% (v/v) in the first stain. In other embodiments, the amount of toluidine blue ranges from 1% to 4% (v/v), or from 2% to 3% (v/v) in the first stain.

A second stain stored in a second reservoir comprises an eosinophilic solution (e.g., xanthene dye) and a fixative reagent. For example, in some embodiments, the second stain comprises eosin Y as the eosinophilic solution and an alcohol (e.g., ethanol) as the fixative reagent. Eosin Y is a fluorescent acidic compound that binds to and forms salts with basophilic or eosinophilic compounds like proteins containing amino acid residues such as arginine and lysine and stains them dark red or pink as a result of the actions of bromine on fluorescein. In some embodiments, the amount of eosin Y ranges from 0.5% to 5% (v/v) in the second stain. In other embodiments, the amount of eosin Y ranges from 1% to 4% (v/v), or from 2% to 3% (v/v) in the second stain.

As discussed earlier, the first stain and the second stain components (e.g., toluidine blue and eosin Y) may be combined or mixed to form a single stain or mixture that is able to stain the sample. In some embodiments, the ratio between the first stain and the second stain may be 50:50. In other embodiments, the ratio between the first stain and the second stain may range between 60:40 and 40:60, between 70:30 and 30:70, or between 80:20 and 20:80. In still other embodiments, the ratio between the first stain and the second stain may range between 90:10 and 10:90.

The image capture system 160 may employ a high-resolution camera mounted in the optical path of a microscope/magnifier to capture 2D or 3D images. The wait time between capturing an image after staining can be, for example, 120 seconds or less, 100 seconds or less, 80 seconds or less, or 60 seconds or less. The automated ROSE machine 100 can comprise an inbuilt digital camera and may include magnification options of 1×, 2×, 4×, 10×, 20×, 40×, 60×, or 100× with or without an X10 wide field eyepiece, for magnification up to 1000×. Higher magnifications are also within the scope of the present disclosure. The automated ROSE machine 100 can also comprise an LED illumination system and a rheostat brightness control to allow the level of lighting to be balanced to the object. The focus of the automated ROSE machine 100 may be fixed so that the focus does not have to be adjusted by the operator of the automated ROSE machine 100. In some embodiments, the operator may adjust the focus. The digital camera can also be supported by software that is suitable for known operating systems.

The digital images captured by the digital camera may be stored on the automated ROSE machine 100 or may be stored remotely. The digital images may be available immediately for local or off-site review.

Figure 4:
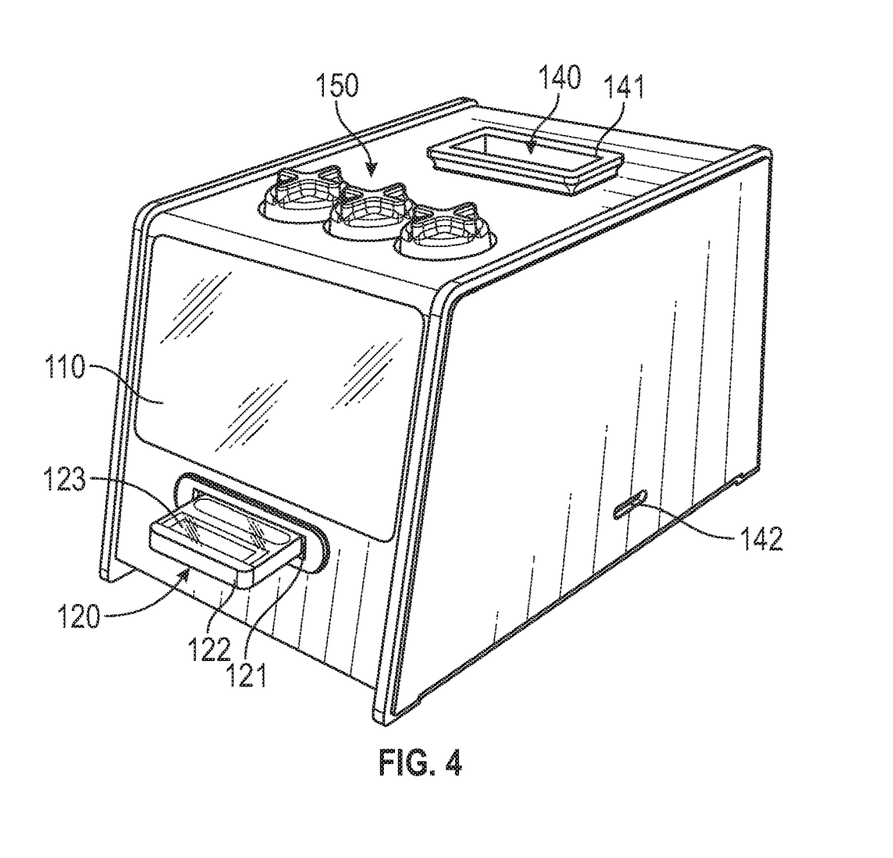
FIG. 4 illustrates an isometric view of an automated ROSE machine for receiving a biological sample, according to one embodiment of the present disclosure.

FIGS. 4-9 illustrate the process of smearing, staining, and imaging a biological sample using the automated ROSE machine 100. FIG. 4 illustrates the automated ROSE machine 100. The operator obtains a biological sample (such as an FNA sample) and then deposits the sample on a sample slide 123. The operator may put proper patient identification on the sample slide 123. The sample slide 123 may be disposed on the shelf 122. After the sample is deposited on the sample slide 123, the track system 130 transports the sample slide 123 into the housing 102 of the automated ROSE machine 100. The operator may commence the operation of the automated ROSE machine 100 by pressing a "start" button on the user interactive screen 110. The sample slide 123 may be obtained from the slide storage chamber 143 and transported to the shelf 122 via the track system 130 and the automated ROSE machine 100 may be configured to label the sample slide 123 with proper patient identification.

Figure 5:
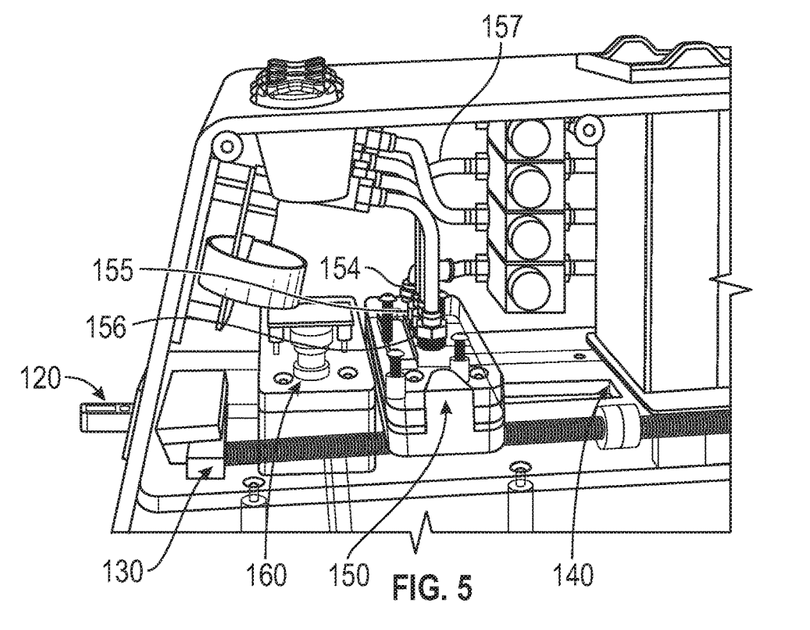
FIG. 5 illustrates an inner view of the automated ROSE machine of FIG. 4 with a smearing system, a staining system, and an image capture system.

FIG. 5 illustrates an inner view of the automated ROSE machine 100. The sample slide 123 is transported rearward toward the smearing system 140 by the track system 130. The drive motor 132 powers the movement of the track system 130.

Figure 6:
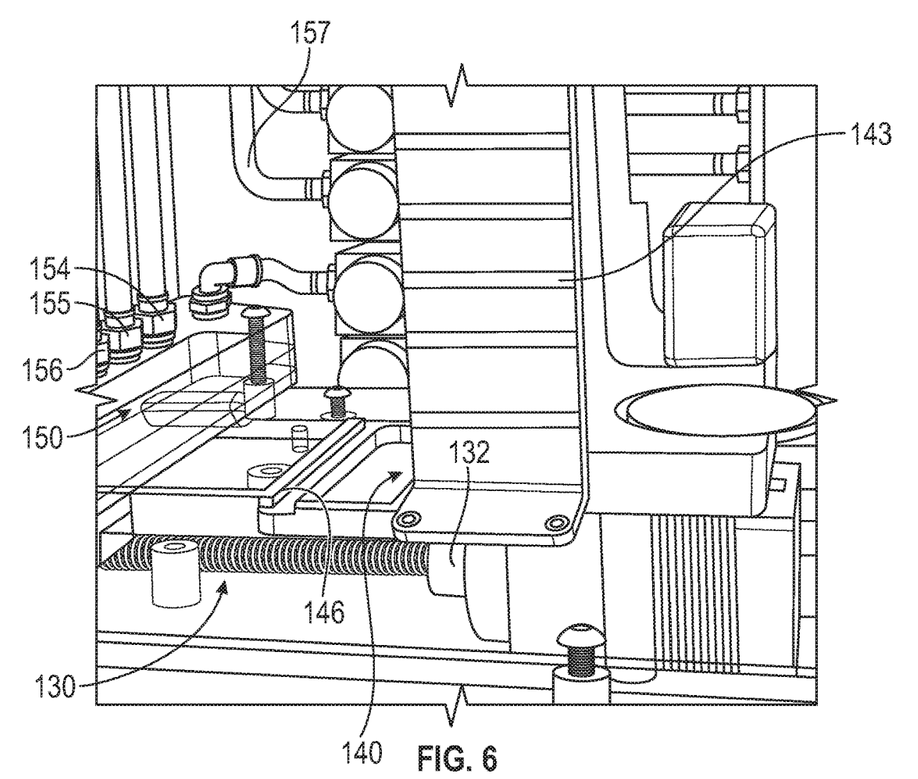
FIG. 6 illustrates a detailed inner view of the smearing system of the automated ROSE machine of FIG. 5.

FIG. 6 illustrates an inner view of the automated ROSE machine 100 with the sample slide 123 at the smearing system 140. As discussed above, a smearing slide is dropped or released out of the slide storage chamber 143. The smearing slide is used to smear the sample disposed on the sample slide 123. This may be accomplished by dropping the smearing slide on top of the sample slide 123, and then transporting the sample slide 123 in a forward direction. A shoulder 146 engages with the smearing slide but allows the sample slide 123 to pass under the shoulder 146. The shoulder 146 thus pushes the smearing slide off of the sample slide 123, which smears the sample. After the smearing slide is used to smear the sample disposed on the sample slide 123, the smearing slide moves down the ramp 144 and is ejected out of the slide-smearing ejection port 142.

Figure 7:
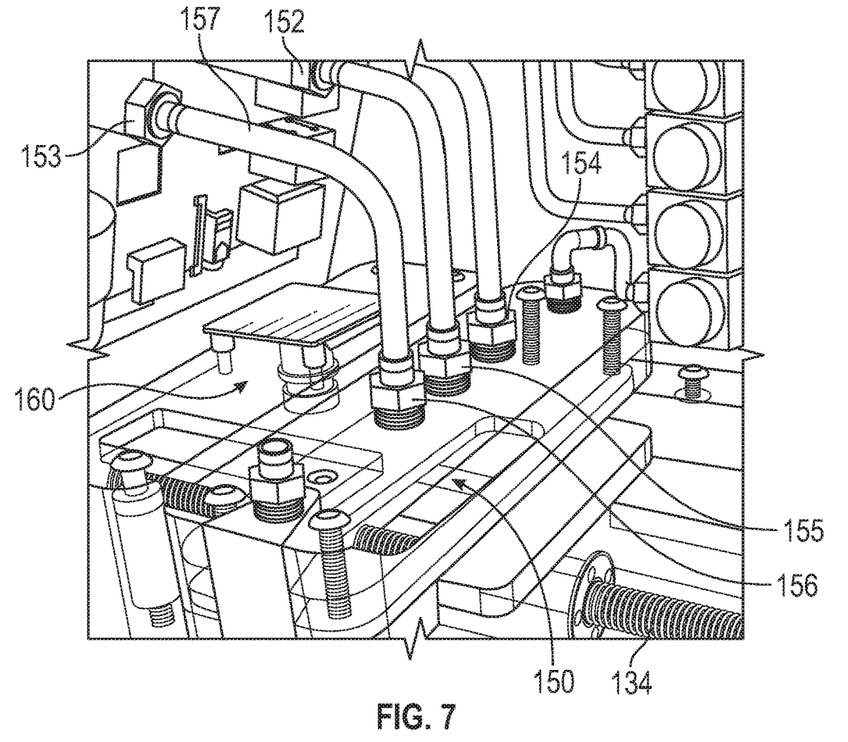
FIG. 7 illustrates a detailed inner view of the staining system of the automated ROSE machine of FIG. 5.

FIG. 7 illustrates an inner view of the automated ROSE machine 100 at the staining system 150. The track system 130 may transport the sample on the sample slide 123 to the staining system 150. The staining system 150 dispenses a precise volume of the stain. As discussed above, one stain may be used, or two stains may be used sequentially. After the stains are dispersed on the sample, the sample slide 123 may be tilted and water may be dispersed from a third dispenser connected or coupled a third stain reservoir to remove unwanted excess stains. In some embodiments, the sample slide 123 may be tilted up to 45 degrees. Gravity enables excess fluids to run of the sample slide 123. Excess fluids are then drained into a waste container.

After the stain is dispersed on the sample slide 123, a cover slip may be applied to the sample slide 123. Pneumatic suction can be configured to pick up the cover slip and apply the cover slip to the sample.

Figure 8:
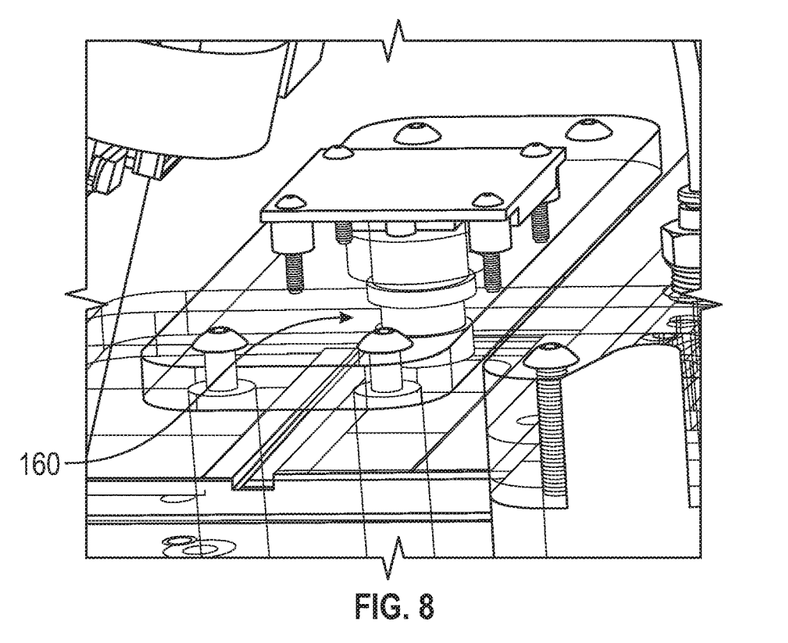
FIG. 8 illustrates a detailed view of the image capture system of the automated ROSE machine of FIG. 5.

FIG. 8 illustrates an inner view of the automated ROSE machine 100 at the image system 160. The track system 130 may transport the sample on the sample slide 123 to the image system 160. A high-resolution camera, capable of magnification up to 1000×, may be used to capture live images. These images may be displayed on the user interface screen 110. The images captured by the camera may be available on a network in seconds. The sample slide 123 may be disposed on a stage that may be robotically controlled. In other words, the stage may move the sample to the left, to the right, up, down, etc. to capture a good image of the sample.

Figure 9:
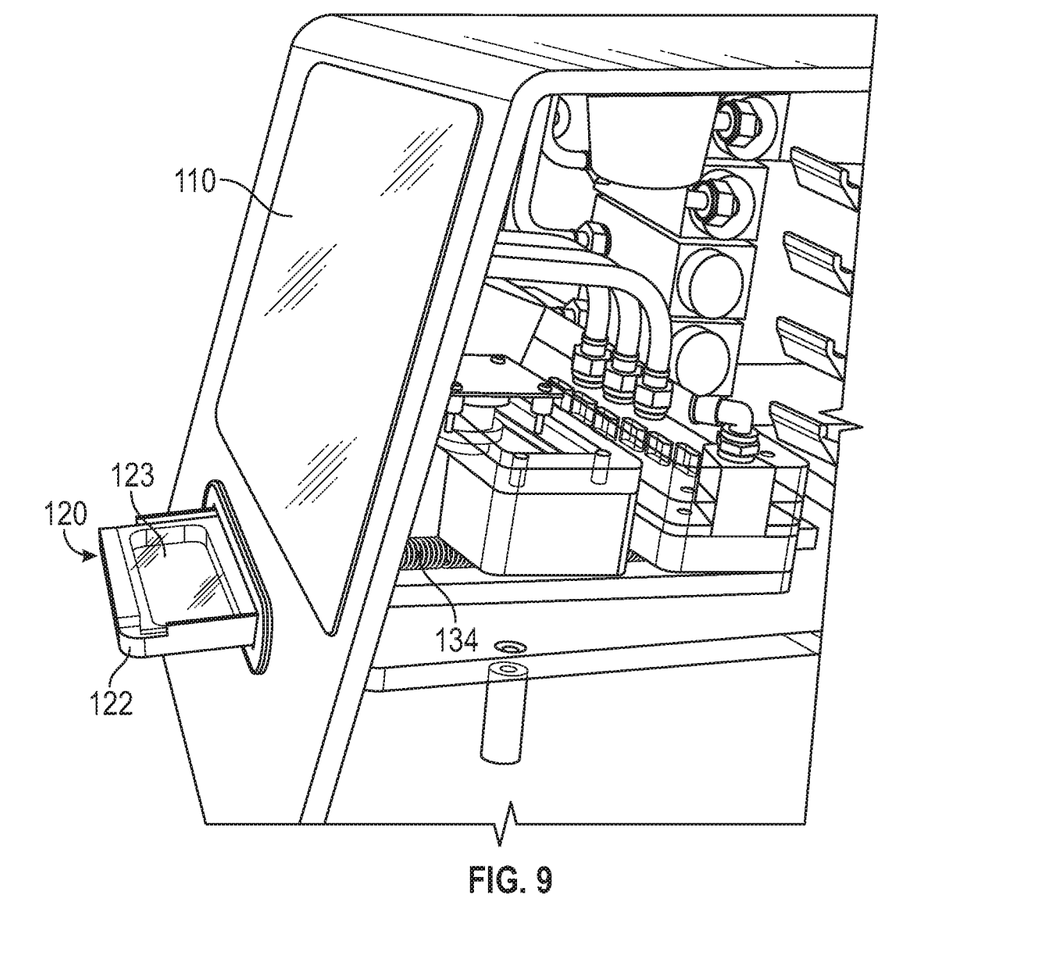
FIG. 9 illustrates a detailed view of the automated ROSE machine after a biological sample has been smeared, stained, and imaged by the ROSE machine.

FIG. 9 illustrates the smeared and stained sample on the sample slide 123 ejected from entry port 121 of the slide and/or sample receiver 120. The sample slide may be placed in an alcohol fixative to be processed later in the laboratory. The sample may be restained with a standard PAP stain or utilized for molecular studies.

The automated ROSE machine 100 may further include artificial intelligence, such as a machine learning platform. The machine learning platform can be tailored to a number of different stains, such as the TEA stain disclosed above. The machine learning platform can be configured to examine one or more captured images and analyze them for the presence or absence of tumor cells. In some embodiments, the ROSE machine 100 may render general cytologic categories (unsatisfactory, benign, atypical, suspicious malignant). In some embodiments, the ROSE machine 100 may render a benign cell or malignant cell present result. In some embodiments, the ROSE machine 100 may render a pathologic diagnosis.

Figure 10:
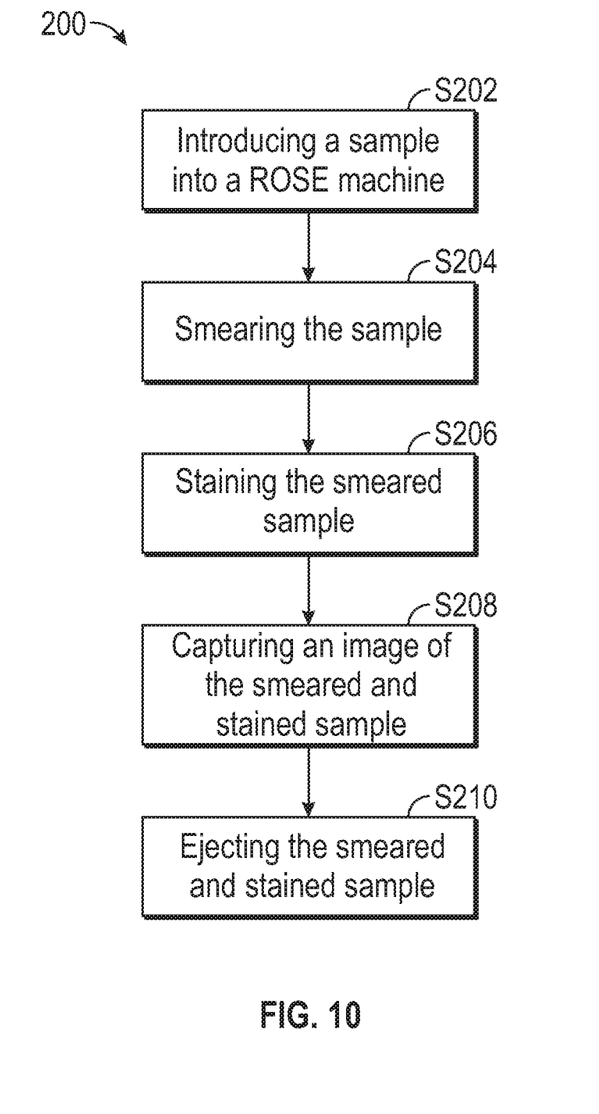
FIG. 10 illustrates a flow chart of a method or process of using the automated ROSE of FIG. 1.

FIG. 10 illustrates a flow chart of a method or process 200 of using the automated ROSE machine 100. Step S202 includes introducing a sample into the automated ROSE machine 100. As discussed above, the sample may be an FNA sample, bodily fluids, a frozen section, and the like.

The sample may be introduced directly into the automated ROSE machine 100, or the sample may be placed on a sample slide, such as sample slide 123, and introduced via the specimen entry port 121.

Step S204 includes smearing the sample. As discussed above, the automated ROSE machine 100 may smear the sample using the smearing system 140.

Step S206 includes staining the smeared sample with histological stains. As discussed above, the sample may be stained with one or more stains. Potential stains include the disclosed TEA stain, methyl green, methylene blue, pyronin G, toluidine blue, acid fuschin, aniline blue, eosin, orange g, and the like. The sample may be stained using the staining system 150 discussed above.

Step S208 includes capturing an image of the smeared sample. The image may be captured using a digital camera that is able to capture images using up to 1000× magnification.

Step S210 includes ejecting the smear sample from the automated ROSE machine 100 for potential future analysis. For example, the smeared sample may be placed in an alcohol fixative to be processed later in the laboratory. The smeared sample may be restrained with a standard PAP stain or utilized for molecular studies.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The invention claimed is:

1. An automated rapid on-site evaluation machine comprising:
    a housing;
    a smearing system configured to smear a biological sample on a sample slide the smearing system comprising a slide storage chamber that is disposed within the housing, wherein a plurality of slides are disposed within the slide storage chamber, wherein the slide storage chamber ejects a smearing slide out of the slide storage chamber on top of the sample slide with the sample, and wherein the sample slide moves relative to the smearing slide to smear the sample on the sample slide;
    a staining system configured to stain the sample;
    an image capture system configured to capture a magnified image of the sample; and
    a transport system for transporting the sample slide with the sample to at least one of the smearing system, the staining system, or the image capture system.

2. The automated rapid on-site evaluation machine of claim 1, further comprising:
    a port configured for receiving the sample slide with the sample disposed thereon.

3. The automated rapid on-site evaluation machine of claim 2, further comprising:
    a shelf that extends out of the port for receiving the sample slide with the sample disposed thereon.

4. The automated rapid on-site evaluation machine of claim 1, wherein a wait time between staining the sample and image capture is less than 60 seconds.

5. The automated rapid on-site evaluation machine of claim 1, wherein the staining system utilizes a single stain or any existing rapid stains including toluidine blue stain.

6. The automated rapid on-site evaluation machine of claim 1, wherein the first stain further comprises de-ionized water.

7. The automated rapid on-site evaluation machine of claim 1, wherein after the sample is smeared, the smearing slide is ejected through an ejection port.

8. The automated rapid on-site evaluation machine of claim 1, further comprising a cover slip disposed on top of the sample slide after staining.

9. The automated rapid on-site evaluation machine of claim 1, wherein the staining system comprises a plurality of dispensers, wherein each dispenser is coupled to a corresponding stain reservoir.

10. The automated rapid on-side evaluation machine of claim 1, wherein the sample comprises a fine needle aspiration sample or biopsy touch prints obtained from body sites, such as a lung, thyroid, pancreas, sentinel lymph nodes in breasts, or skin.

11. The automated rapid on-site evaluation machine of claim 1, wherein the staining system is configured to dispense a stain comprising:
    a first solution comprising:
        eosin Y; and
        alcohol, wherein the eosin Y ranges from 0.5% to 5%; and
    a second solution comprising:
        toluidine blue; and
        alcohol, wherein the toluidine blue ranges from 0.1% to 5%.

12. The automated rapid on-site evaluation machine of claim 11, wherein the stain comprises a mixture of the first solution and the second solution mixed together.

13. The automated rapid on-site evaluation machine of claim 12, wherein a ratio of the mixture of the first solution and the second solution ranges between 60:40 and 40:60.

14. The automated rapid on-site evaluation machine of claim 11, wherein the first solution and the second solution are applied sequentially.

\* \* \* \* \*